United States Patent
Kondo

(10) Patent No.: US 8,031,219 B2
(45) Date of Patent: Oct. 4, 2011

(54) IMAGE FORMING APPARATUS AND CONTROL METHOD THEREOF

(75) Inventor: Shunsaku Kondo, Toride (JP)

(73) Assignee: Canon Kabushiki Kaisha (JP)

( * ) Notice: Subject to any disclaimer, the term of this patent is extended or adjusted under 35 U.S.C. 154(b) by 670 days.

(21) Appl. No.: 12/169,978

(22) Filed: Jul. 9, 2008

(65) Prior Publication Data

US 2009/0015885 A1  Jan. 15, 2009

(30) Foreign Application Priority Data

Jul. 10, 2007 (JP) .................................. 2007-181444

(51) Int. Cl.
*B41J 2/435* (2006.01)
(52) U.S. Cl. ........................................................ 347/249
(58) Field of Classification Search .................. 347/229, 347/234, 243, 249, 259–261
See application file for complete search history.

(56) References Cited

U.S. PATENT DOCUMENTS

| | | | | |
|---|---|---|---|---|
| 6,813,451 B2 * | 11/2004 | Wibbels | ........................... | 399/45 |
| 6,833,856 B2 * | 12/2004 | Maeda | ........................... | 347/248 |
| 6,839,078 B2 * | 1/2005 | Izumiya et al. | ............... | 347/249 |
| 7,130,097 B2 * | 10/2006 | Higashi et al. | ............. | 359/216.1 |
| 7,499,072 B2 * | 3/2009 | Izumiya et al. | ............... | 347/249 |
| 7,542,065 B2 * | 6/2009 | Makino | ........................... | 347/261 |

FOREIGN PATENT DOCUMENTS

JP   2003-241610 A   8/2003

* cited by examiner

*Primary Examiner* — Hai C Pham
(74) *Attorney, Agent, or Firm* — Rossi, Kimms & McDowell LLP

(57) ABSTRACT

A frequency adjusting unit adjusts a frequency of the clock signal to be supplied to a drive unit when an image is to be formed on the second face in response to a contraction ratio of the printing material on which an image has been formed on the first face. The phase difference determining unit determines a phase difference between the clock signal corresponding to the first face and the clock signal corresponding to the second face in response to a frequency difference and a sign thereof between the clock signal corresponding to the first face and the clock signal corresponding to the second face. The change control unit changes from the clock signal corresponding to the first face to the clock signal corresponding to the second face.

5 Claims, 8 Drawing Sheets

F I G. 4A

|  | PAPER TYPE A | PAPER TYPE B | PAPER TYPE C | PAPER TYPE D |
|---|---|---|---|---|
| BD SIGNAL REFERENCE PERIOD (FRONT SIDE) | 100.0% | 100.0% | 100.0% | 100.0% |
| BD SIGNAL REFERENCE PERIOD (BACK SIDE) | 99.8% | 99.85% | 99.95% | 100.0% |

F I G. 4B

|  | PAPER TYPE A | PAPER TYPE B | PAPER TYPE C | PAPER TYPE D |
|---|---|---|---|---|
| CONTRACTION RATIO AFTER FIXING | 0.2% | 0.15% | 0.05% | 0% |

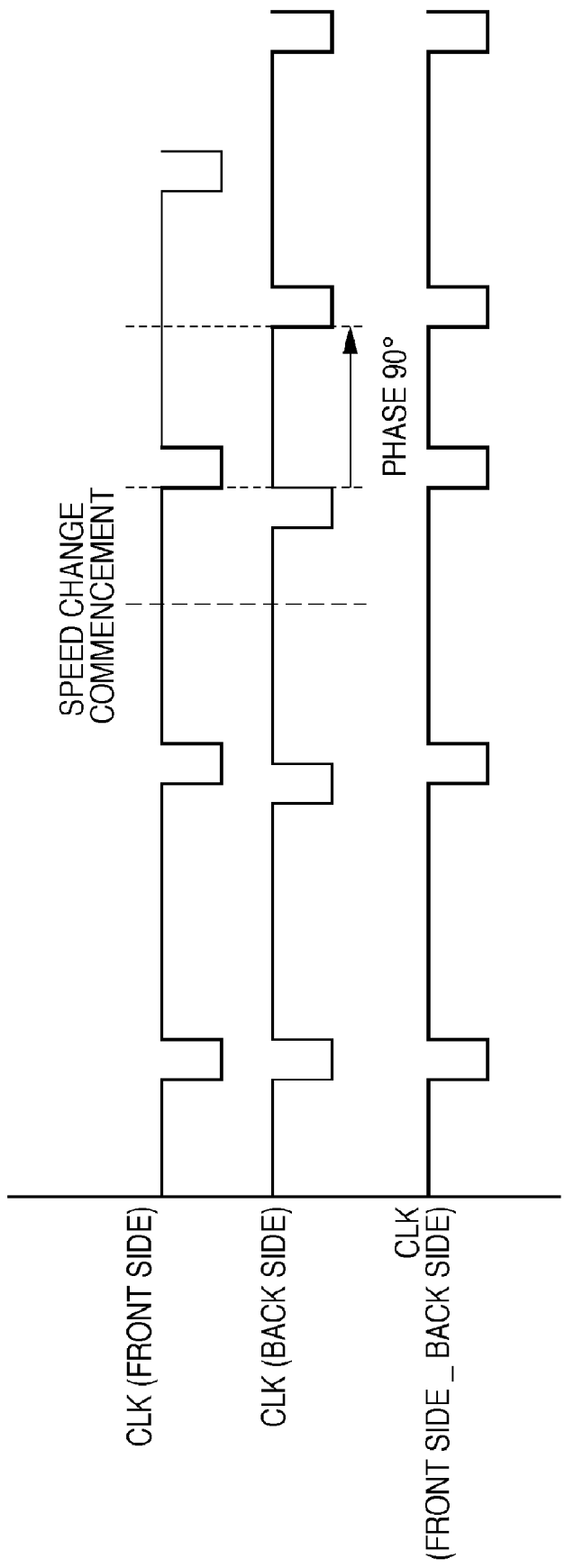

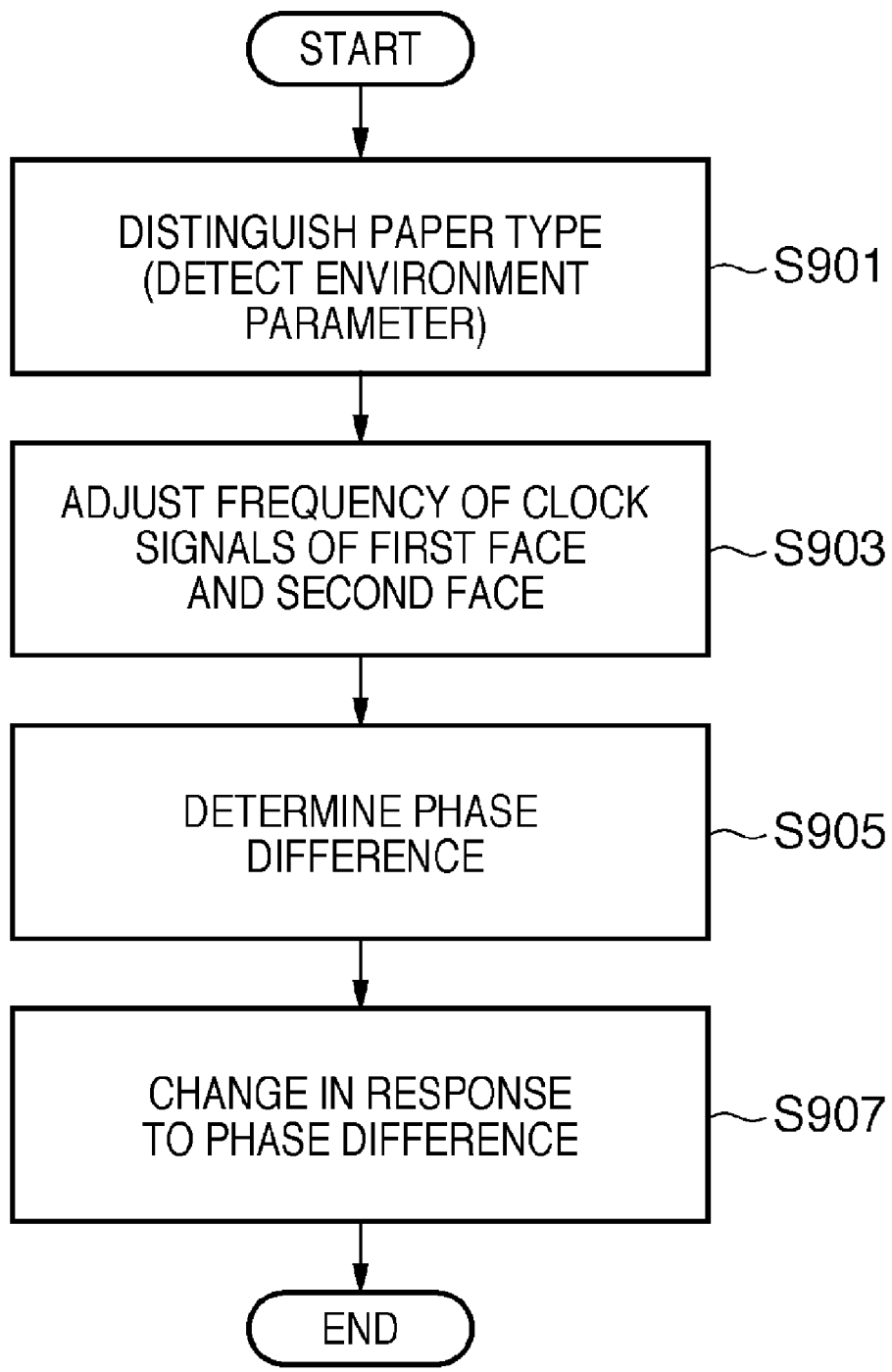

IMAGE FORMING APPARATUS AND CONTROL METHOD THEREOF

BACKGROUND OF THE INVENTION

1. Field of the Invention

The present invention generally relates to image forming apparatuses, and particularly relates to image forming apparatuses and control methods thereof capable of forming an image on both sides of printing material.

2. Description of the Related Art

Electrophotographic printing operations involve processes of exposing, developing, transferring, and fixing. In the exposing process, a light beam that is modulated based on image data becomes a scanning light due to a polygonal mirror, and an electrostatic latent image is formed by scanning a surface of a photosensitive drum. In the developing process, the electrostatic latent image is developed as a toner image by a development apparatus. In the transfer process, the toner image is transferred to a printing paper by a transfer roller. Then, in the fixing process, the toner image is fixed to the printing paper by applying pressure and fixing heat using a fixing unit.

In this regard, water contained in the printing paper evaporates rapidly due to the fixing heat, thereby causing a phenomenon to occur in which the printing paper contracts. This phenomenon exerts an adverse effect on double sided printing. That is, when an image that has been transferred to the front side of the printing paper undergoes fixing, the image shrinks along with the printing paper, and therefore compared to an image formed on the back side of the same printing paper, the image size is undesirably different. In other words, the magnification ratios of the front and back images formed on the printing paper deviate undesirably.

In order to address this issue, a method has been proposed (Japanese Patent Laid-Open No. 2003-241610) in which the front and back magnification ratios are made to match each other by adjusting a rotation velocity of the polygonal mirror. For example, when the image on the front side shrinks by 1% due to the fixing heat, the magnification ratio of the front side image and the magnification ratio of the back side image can be made to match each other by increasing the rotation velocity of the polygonal mirror by 1% when carrying out image forming on the back side.

Unfortunately, with the invention described in the aforementioned patent document, image forming cannot be carried out during a convergence time from the commencement of a change in the rotation velocity until the rotation velocity stabilizes. Since the convergence time is generally longer than the interval between printing papers (a so-called "time between sheets") when continuously carrying out single sided printing, a new problem is presented in that the productivity of printing is reduced.

SUMMARY OF THE INVENTION

Accordingly, a feature of the present invention is to provide a solution for at least one issue among these and other issues. For example, it is a feature of the present invention for image forming apparatuses capable of double sided printing to match the front and back image sizes with high accuracy while as much as possible not allowing a drop in print productivity. It should be noted in regard to other issues that these will be evident from the specification overall.

The present invention can be achieved for example as an image forming apparatus capable of forming an image on both sides of a printing material and a control method thereof. The image forming apparatus includes a rotating polygonal mirror that rotationally deflects a light beam outputted from a light source so as to expose a photosensitive member, and a drive unit that drives the rotating polygonal mirror in response to a supplied clock signal. The image forming apparatus particularly includes a frequency adjusting unit, a phase difference determining unit, and a change control unit. The frequency adjusting unit adjusts a frequency of the clock signal to be supplied to the drive unit when an image is to be formed on the second face in response to a contraction ratio of the printing material on which an image has been formed on the first face so as to reduce a difference between the magnification ratio of the image formed on the first face of the printing material and the magnification ratio of the image formed on the second face of the printing material. The phase difference determining unit determines a phase difference between the clock signal corresponding to the first face and the clock signal corresponding to the second face in response to a frequency difference and a sign thereof between the clock signal corresponding to the first face and the clock signal corresponding to the second face. The change control unit changes from the clock signal corresponding to the first face to the clock signal corresponding to the second face so as to achieve the determined phase difference.

Further features of the present invention will become apparent from the following description of exemplary embodiments with reference to the attached drawings.

BRIEF DESCRIPTION OF THE DRAWINGS

FIG. 4A is a diagram showing one example of a reference period table according to the present embodiment.

FIG. 4B is a diagram of one example of a contraction ratio table showing a relationship between paper type and contraction ratio immediately after fixing according to the present embodiment.

FIG. 8 is a diagram for describing change in the clock signals when the phase difference is set to 90° according to the present embodiment.

FIG. 9 is an illustrative flowchart showing a control method according to the present embodiment.

DESCRIPTION OF THE EMBODIMENTS

Overall Configuration

Figure 1:
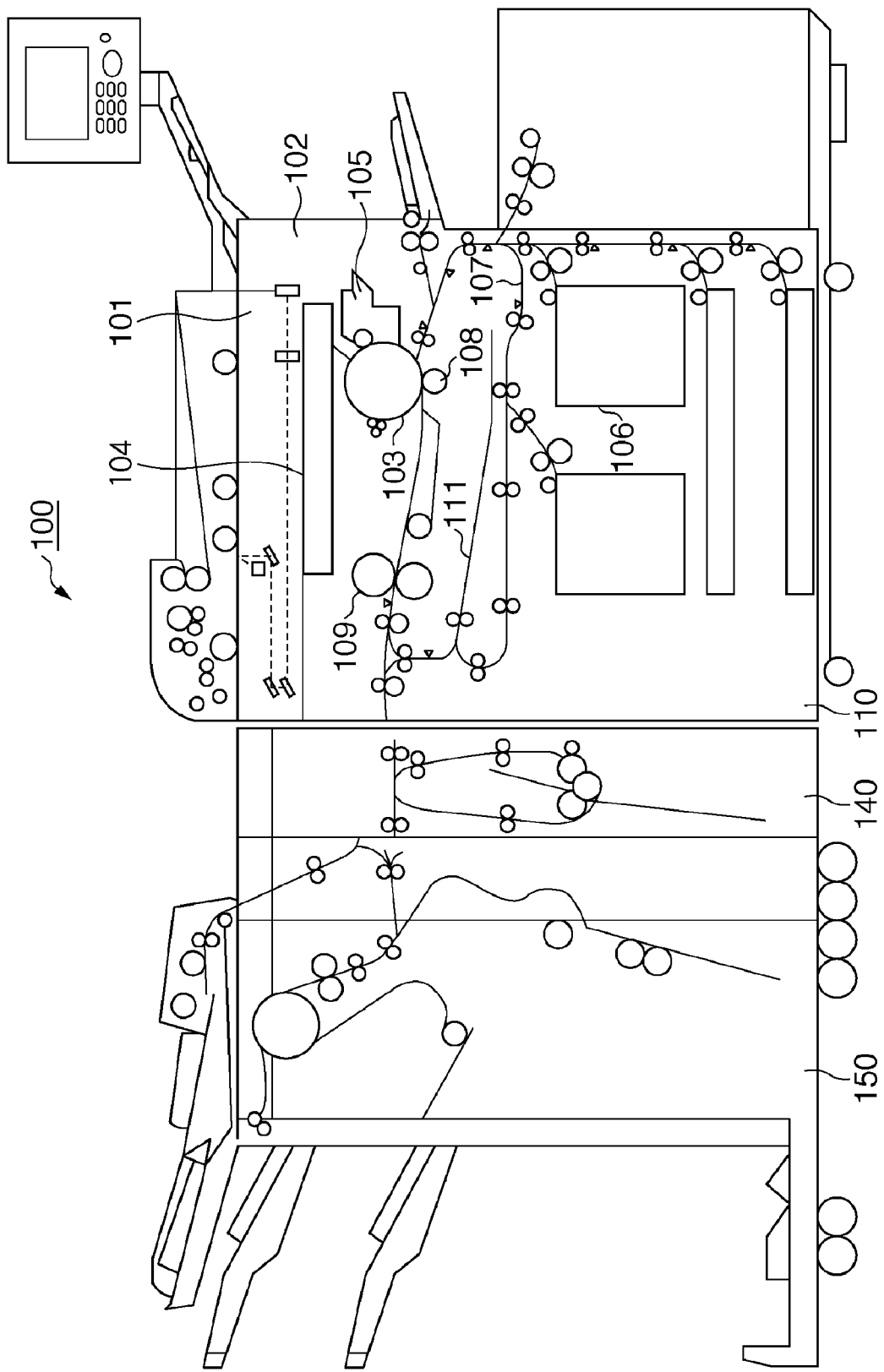
FIG. 1 is a diagram showing a configuration of an image forming apparatus according to an embodiment.

FIG. 1 is a diagram showing a configuration of an image forming apparatus capable of forming an image on both sides of printing material according to the present embodiment. An image forming apparatus 100 according to the present embodiment is constituted by components such as a main unit 110, a folding unit 140, and a finisher 150. However, an image forming apparatus according to the present invention may be realized as a printing apparatus, a printer, a copier, a multi-function peripheral, a facsimile machine, or the like.

The main unit 110 is constituted by an image reader 101 that reads images of originals and a printer 102. In the image reader 101, an original is read and corresponding image data is generated for outputting to an exposure control unit 104 of the printer 102.

The exposure control unit 104 outputs a light beam from a light source based on the inputted image data, and exposure and scanning is performed on a photosensitive drum 103 using this light beam. In this manner, an electrostatic latent image is formed on the photosensitive drum 103 in response to the light beam that has been scanned. It should be noted that the photosensitive drum 103 is also sometimes referred to as a photosensitive member or an image carrier. And the exposure control unit 104 and the photosensitive drum 103 are also sometimes referred to as an image forming unit.

The electrostatic latent image on the photosensitive drum 103 is made into a visible image as a developer image (toner image) by developer supplied from a developer 105. Paper is fed from a cassette 106 or a double-side conveying path 107 with a timing synchronized with commencement of irradiation of the light beam. The paper is conveyed to an image forming unit (transfer unit) that is constituted by the photosensitive drum 103 and a transfer roller 108. Then, the developer image that has been formed on the photosensitive drum 103 is transferred onto the paper by the transfer roller 108. It should be noted that the paper may also be referred to as printing substrate, printing material, printing paper, sheet, transfer material, transfer paper, and the like.

The paper on which the developer image has been transferred is conveyed to a fixing unit 109. The fixing unit 109 fixes the developer image onto the paper by applying pressure and heat to the paper. The paper that has passed through the fixing unit 109 is discharged to the outside (to the folding unit 140) from the printer 102 via a flapper and discharge rollers.

It should be noted that in a case where double sided printing has been instructed in which image forming is to be carried out on both sides of the paper, the paper is guided to an inversion path 111 by a switching operation of the flapper. Further still, the paper that has been inverted front to back is conveyed to the double-side conveying path 107. The paper that has been guided to the double-side conveying path 107 is re-fed between the photosensitive drum 103 and the transfer roller 108 using the above-described timing. An image is formed on the back side of the paper also, then undergoes the fixing process by the fixing unit 109, and is discharged outside.

The folding unit 140 carries out a process in which the paper is folded into a Z-shape. For example, in a case where the sheets are of an A3 size or B4 size and folding processing has been instructed, the folding unit 140 carries out a folding process on the paper. In a case where instruction has been given otherwise, the paper passes through the folding unit 140 to be sent to the finisher 150. The finisher 150 is an apparatus that for example executes processes such as bookbinding, stitching, and punching. Here, a photosensitive drum is used as the image carrier of the image forming apparatus, but a photosensitive belt may also be used.

Exposure Control Unit

Figure 2:
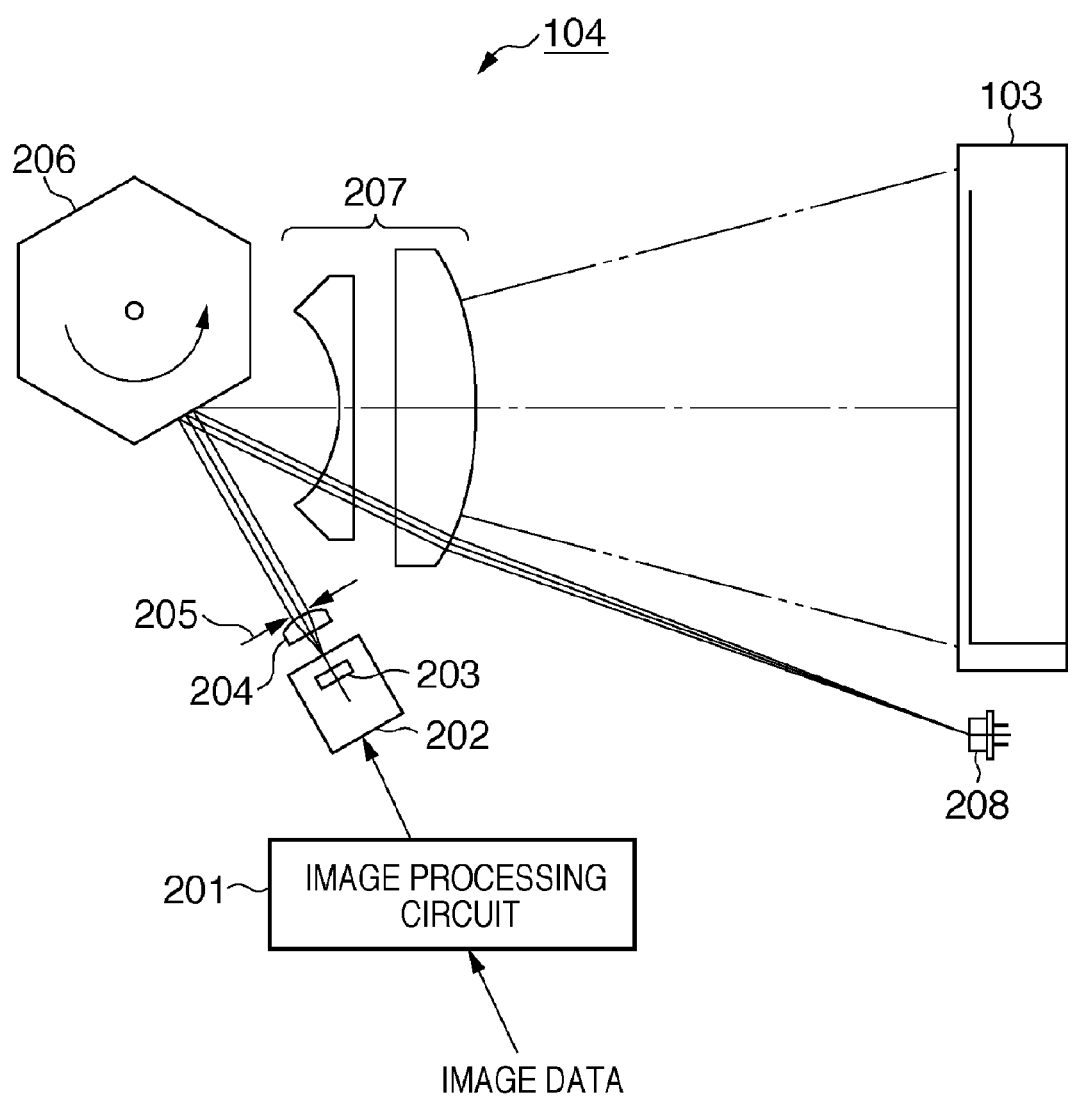
FIG. 2 is a diagram that schematically shows a configuration of an exposure control unit 104.

FIG. 2 is a diagram that schematically shows a configuration of the exposure control unit 104. An image processing circuit 201 performs pixel modulation on the image data inputted from the outside (for example, from an image reader 101) and outputs a pixel modulated image signal that is synchronized with an image clock. A laser driving apparatus 202 drives a semiconductor laser 203 based on the image signal outputted from the image processing circuit 201. In the present embodiment, the semiconductor laser 203 is employed as one example of a light source, but the present invention can also employ a light source of another form.

The light beam outputted from the semiconductor laser 203 becomes a substantially parallel light by passing through an optical system having a collimator lens 204 and a stop 205 and the like, and becomes incident on a polygonal mirror 206 having a predetermined beam diameter. The polygonal mirror 206 rotates at an equiangular velocity in a predetermined direction. Accompanying this rotation, the light beam that is incident on the polygonal mirror 206 becomes a deflected beam having a continuously changing angle. The polygonal mirror 206 is one example of a rotating polygonal mirror that rotationally deflects a light beam outputted from a light source so as to expose a photosensitive member.

The light beam that has become a deflected beam receives a focusing effect by an fθ lens 207. Furthermore, at the same time, the fθ lens 207 carries out correction of distortion aberration to ensure temporal linearity during scanning, and therefore the light beam that has passed through the fθ lens 207 is made to perform combined scanning at a uniform velocity in a predetermined direction on the photosensitive drum 103. A BD sensor 208 that detects light beams reflected by the polygonal mirror 206 is provided near one end of the photosensitive drum 103. BD is an abbreviation of beam detect (beam detection). A detection signal (BD signal) outputted from the BD sensor is used as a synchronization signal for achieving synchronization between the rotation of the polygonal mirror 206 and the writing of data. Therefore, the BD signal is sometimes called a main scanning reference signal.

Mechanism of Thermal Contraction in the Fixing Unit

A considerable amount of water is contained in the papers loaded into the cassette 106 or the like. The amount of water is dependent on environmental parameters such as the temperature and humidity of the environment (ambient atmosphere) in which the image forming apparatus 100 is installed. A developer image is transferred onto the front side (hereinafter referred to as "first face") of a paper containing water by the photosensitive drum 103 and the transfer roller 108. Paper contraction is not evident at the time of transfer. After this, when the paper is conveyed to the fixing unit 109 and a fixing operation is carried out using heat and pressure, the water contained in the paper undergoes immediate evaporation. In this manner, the entire paper contracts due to the distances between fibers in the paper contracting. It goes without saying that the image on the front side also contracts along with the paper.

After this, the paper is again conveyed to the photosensitive drum 103 and the transfer roller 108 via the double-side conveying path 107 so as to carry out image forming on the back side (hereinafter referred to as "second face"). Although the paper contraction caused by the fixing heat returns to normal gradually over time, that is not to say that the dimensions of the paper completely return to normal before an image is formed on the second face. Even supposing that the dimensions of the paper return to normal, then in that event the image on the second face would be enlarged undesirably.

When double-side image forming is executed using fixing heat in this manner, there is a risk that the magnification ratios of the front and back will change undesirably. Accordingly, in the present embodiment, the apparent size and positional relationship of the images on the first face and the second face are corrected by controlling the rotation velocity of the polygonal mirror to match the contraction ratio of the paper.

It goes without saying that the rotation velocity of the polygonal mirror 206 affects the magnification ratio of the image to be formed.

Scanner Motor Control

Figure 3:
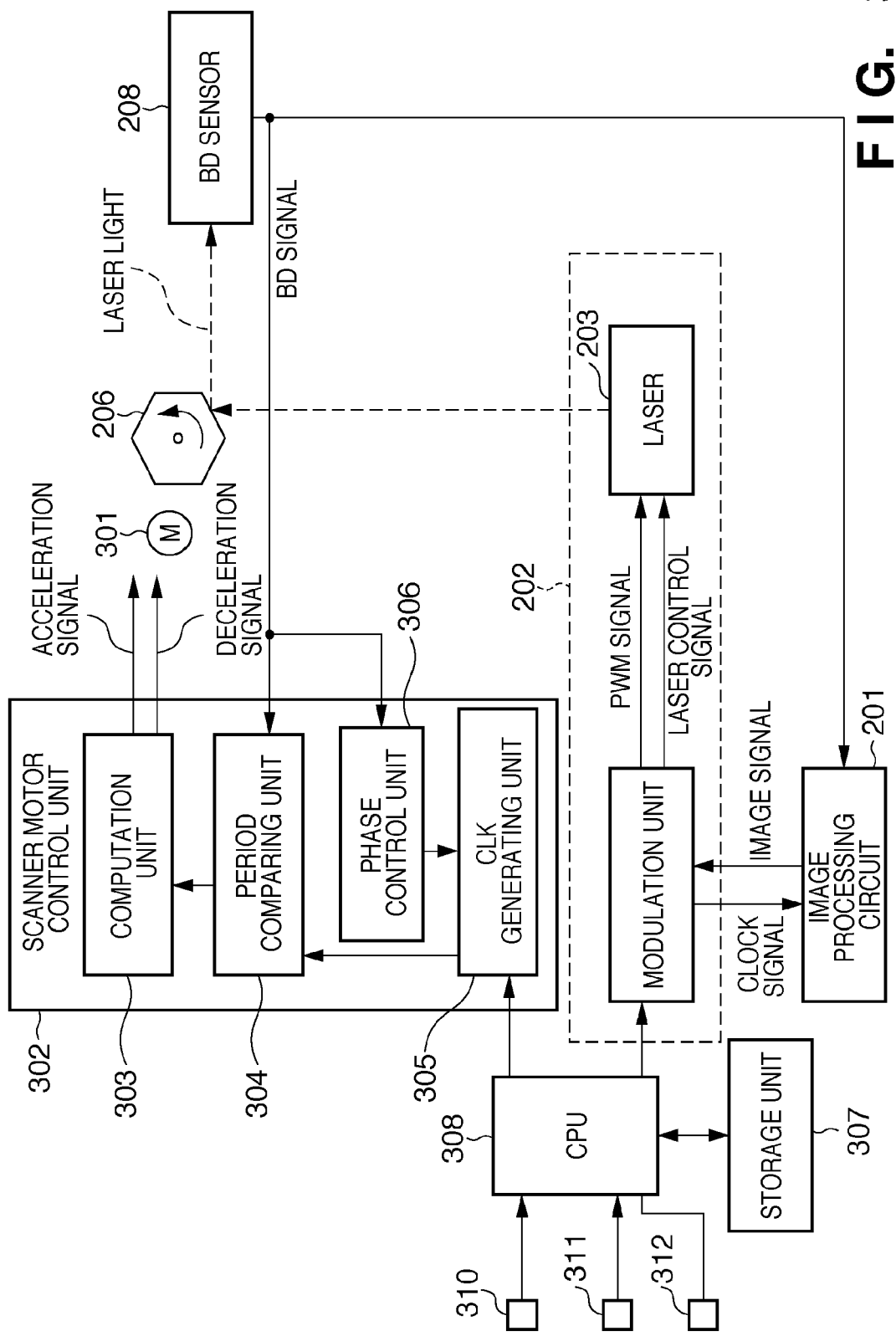
FIG. 3 is a diagram showing one example of an exposure control unit according to the present embodiment.

FIG. 3 is a diagram showing one example of an exposure control unit according to the present embodiment. The polygonal mirror 206 is rotationally driven at a predetermined rotation rate by a scanner motor 301. The scanner motor 301 is one example of a drive unit that drives a rotating polygonal mirror in response to a supplied clock signal.

The scanner motor 301 is controlled by a scanner motor control unit 302. The scanner motor control unit 302 for example is provided with a computation unit 303, a period comparing unit 304, a clock generating unit 305, a phase control unit 306, and the like. The clock generating unit 305 outputs to the period comparing unit 304 a clock signal in accordance with a reference period (frequency) designated by a CPU 308. The BD signal is a signal that the BD sensor 208 outputs for each single line. Naturally it goes without saying that the BD signal is based on the clock signal supplied to the scanner motor 301 at that time.

When the frequency (period) of the clock signal is to be changed between the first face and the second face, the phase control unit 306 adjusts a phase difference between the BD signal that has been outputted from the BD sensor 208 and the clock signal to be applied to the second face so that it becomes a predetermined difference. It should be noted that the processing executed by the phase control unit 306 may also be executed by the clock generating unit 305 and the CPU 308 as is described later. In this case, it would be unnecessary to have the phase control unit 306.

The period comparing unit 304 compares the period of the BD signal and the reference period. In response to a comparison result inputted from the period comparing unit 304, the computation unit 303 outputs an acceleration signal or a deceleration signal to the scanner motor 301 so that the period of the BD signal becomes a target period (reference period). In this way, the scanner motor 301 is driven so as to rotate in a stabilized manner.

The storage unit 307 stores a reference period table. The CPU 308 reads out an appropriate reference period from the reference period table stored in the storage unit 307 and sets this in the clock generating unit. It should be noted that the CPU 308 is one example of a frequency adjusting unit or a phase difference determining unit. The frequency adjusting unit adjusts a frequency of the clock signal to be supplied to the drive unit when an image is to be formed on the second face in response to the contraction ratio of the printing material on which an image has been formed on the first face so as to reduce a difference between the magnification ratio of the image formed on the first face of the printing material and the magnification ratio of the image formed on the second face of the printing material. The phase difference determining unit determines a phase difference between the clock signal corresponding to the first face and the clock signal corresponding to the second face in response to a frequency difference and a sign thereof between the clock signal corresponding to the first face and the clock signal corresponding to the second face. Incidentally, the phase of the BD signal when the clock signal corresponding to the first face is supplied is linked to the phase of the clock signal corresponding to the first face. Accordingly, the phase difference between the BD signal and the clock signal corresponding to the second face may also be determined.

A paper type sensor 310 is a sensor for detecting a type of paper (for example, material, thickness, size or the like) that is loaded in the cassette 106. The paper type sensor 310 is one example of a type distinguishing unit that distinguishes the type of printing material. It should be noted that the paper type sensor 310 may be omitted in a case where the type of paper is to be inputted from an input device such as a control panel or the like. The CPU 308 reads out from the storage unit 307 information of the reference period corresponding to the type of paper that has been detected. It should be noted that the CPU 308 is one example of a frequency determining unit that determines, in response to the type of printing material, the frequency of the clock signal to be supplied when an image is to be formed on the second face.

An environment sensor 311 is one example of a detection unit that detects environment parameters in an environment where the image forming apparatus is installed. Environment parameters include temperature and humidity for example. The CPU 308 may also determine a reference period in response to a detected environment parameter. That is, the CPU 308 is one example of a frequency determining unit that determines, in response to an environment parameter, the frequency of the clock signal to be supplied when an image is to be formed on the second face. Of course, the CPU 308 may also determine the reference period in response to a combination of paper type and environment parameter. It should be noted that the environment sensor 311 is optional.

A measurement unit 312 is a sensor or the like for measuring a convergence time of fluctuation in the rotation velocity. While varying the phase difference for a pair constituted by a specific frequency difference and its sign, the CPU 308 measures the convergence time of the rotation velocity of the scanner motor 301. The frequency difference is a difference between the frequencies of the clock signal for the first face and the clock signal for the second face. Of a plurality of measured convergence times, the CPU 308 writes to the storage unit 307 the phase difference that was used when the smallest convergence time was measured as the phase difference corresponding to the specific frequency difference and its sign. It should be noted that the measurement unit 312 is not absolutely necessary in a case where measurement of the convergence times and determining of phase differences are to be executed at the time of shipping from the factory (such as at the time of manufacturing or a time of inspection).

FIG. 4A is a diagram showing one example of a reference period table according to the present embodiment. The reference period to be applied for the first face and the reference period to be applied for the second face are registered for each type of paper in the reference period table. Here, in a case where an image is to be formed on a type of paper that does not contract after the toner image is fixed, or in a case where an image is to be formed without giving considering to contraction, the period of a BD reference signal is set to 100.0%.

According to FIG. 4A, a type of paper (paper type) D is a reference paper type. It should be noted that in a case where environment parameters are also used, a plurality of reference periods (frequencies) corresponding to pairs (groups) of different paper types and environment parameters are registered in the reference period table. It should be noted that it is also possible for the CPU 308 to correct the reference periods obtained from the reference period table shown in FIG. 4A in response to environment parameters.

FIG. 4B is a diagram of one example of a contraction ratio table showing a relationship between paper type and contraction ratios immediately after fixing according to the present embodiment. For example, when a paper type A has been selected, there is 0.2% contraction after fixing. Accordingly, the size of the image formed on the first face of the paper type A contracts to 99.8%. For this reason, if the image on the second face is formed so as to become 99.8% of the size, the front and back magnification ratios will be aligned. The contraction ratio table may be stored in the storage unit 307 instead of the reference period table.

Figure 5:
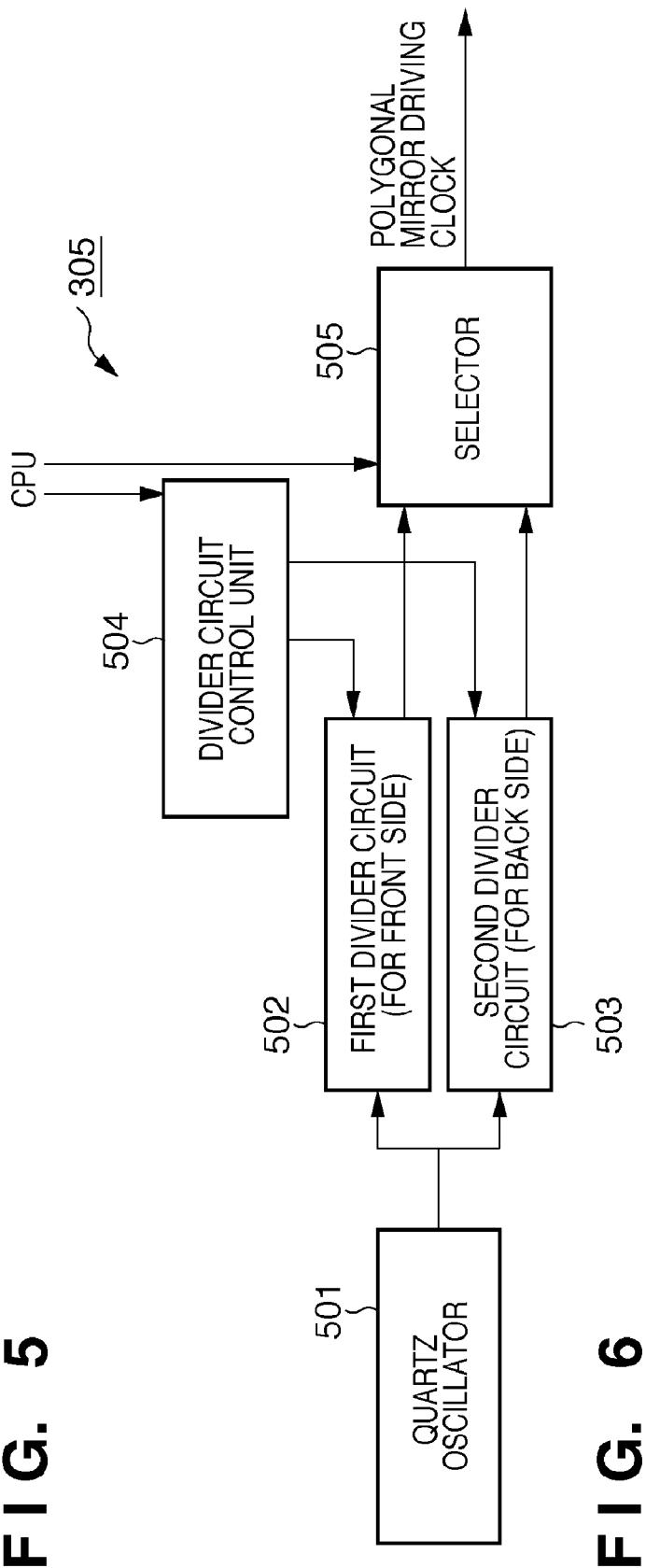
FIG. 5 is a block diagram showing one example of a clock generating unit according to the present embodiment.

FIG. 5 is a block diagram showing one example of a clock generating unit according to the present embodiment. The clock generating unit 305 includes a quartz oscillator 501, a first divider circuit 502 for first-face image forming, a second divider circuit 503 for second-face image forming, a divider circuit control unit 504, and a selector 505.

The CPU 308 outputs a control signal for adjusting the magnification ratio of the image to be formed on the second face to the divider circuit control unit 504. In response to this control signal, the divider circuit control unit 504 outputs instructions (control signals) for varying the frequency of the clock signal for driving the polygonal mirror to the first divider circuit 502 and the second divider circuit 503. The first divider circuit 502 and the second divider circuit 503 vary their divider ratios in response to the instructions from the divider circuit control unit 504. The selector 505 selects and outputs one of either the clock signal to be outputted from the first divider circuit 502 or the clock signal to be outputted from the second divider circuit 503. It should be noted that the selector 505 is one example of a change control unit that changes from the clock signal corresponding to the first face to the clock signal corresponding to the second face so as to achieve the phase difference determined by the CPU 308.

Figure 6:
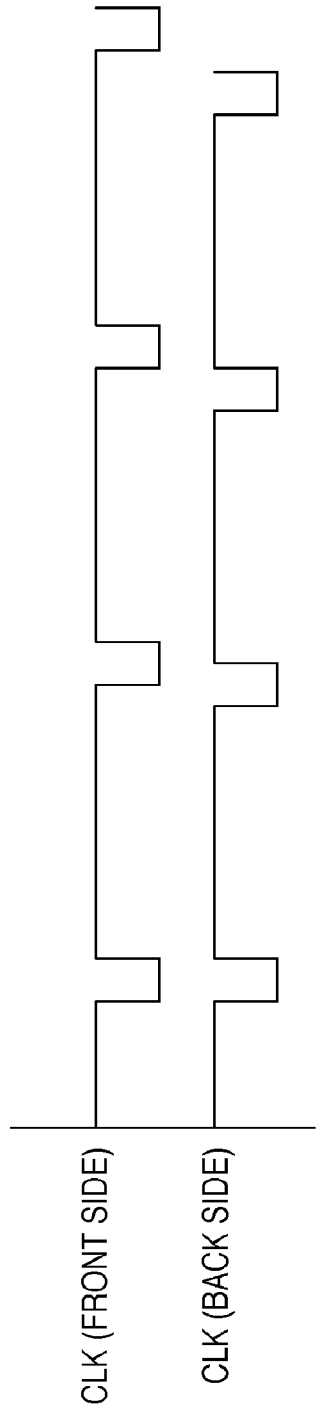
FIG. 6 is a diagram for describing a method for changing from a first-face clock frequency to a second-face clock frequency.

FIG. 6 is a diagram for describing a method for changing from a first-face clock frequency to a second-face clock frequency. As shown in FIG. 6, the frequency of the clock signal for the first face outputted from the first divider circuit is set to 100% of the reference frequency. And the frequency of the clock signal for the second face outputted from the second divider circuit is set to 99.5% of the reference frequency. Since the periods (frequencies) of these clock signals are different, they are asynchronous signals. Incidentally, in conventional techniques in which the present invention is not applied, clock frequencies are changed as they are in an asynchronous state, but this is undesirable due to a following point.

According to research of the inventors of the present application, in cases where the clock signal before changing and the clock signal after changing are not synchronized, it was found that the convergence times of the rotation velocity of the scanner motor 301 vary depending on the phase difference at the commencement time of changing.

Figure 7:
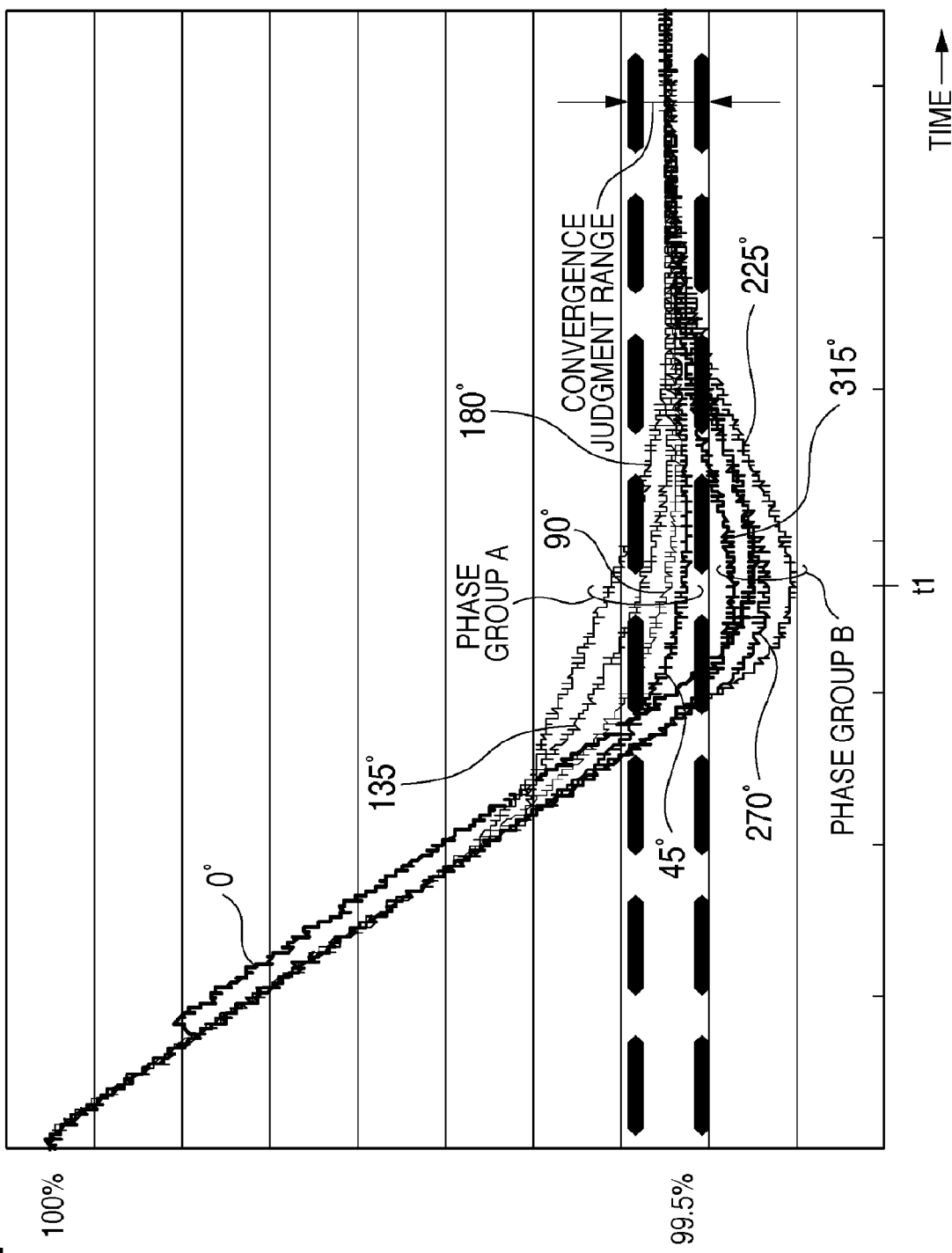
FIG. 7 is a diagram showing one example of convergence for each phase difference when the rotation velocity of a scanner motor is changed.

FIG. 7 is a diagram showing one example of convergence for each phase difference when the rotation velocity of the scanner motor is changed. The vertical axis indicates frequency and the horizontal axis indicates time starting at commencement of the change. The frequencies for the phase differences at the time point t1 from top to bottom are 180°, 135°, 90°, 45°, 315°, 0°, 270°, and 225°. It should be noted that the convergence judgment range described in FIG. 7 indicates a range of rotation velocity that allows image forming based on a jitter standard of the scanner motor.

As is evident from FIG. 7, while the scanner motor changes speed, the rotation velocity does not stabilize. Image quality would be reduced if an image were to be formed in this unstable condition. Accordingly, it is preferable not to form an image until fluctuation in the rotation velocity converges. According to FIG. 7, it is evident that the convergence time of the fluctuation in rotation velocity varies depending on the phase difference as described earlier. However, the phase at which a change in speed commences varies depending on the circumstances. For this reason, conventionally it has been necessary to widen the interval between sheets giving consideration to the maximum convergence time among convergence times corresponding to a plurality of phase differences when changing from front to back side in double sided printing. This is undesirable since it leads to a reduction in productivity.

According to FIG. 7, the phase differences can be classified into a phase group A in which the convergence times are relatively short and a phase group B in which the convergence times are relatively long. The phase group A includes 180°, 135°, 90°, and 45°. While the phase group B includes 315°, 0°, 270°, and 225°.

As a result of testing, it has become evident that there is reproducibility in the relationship between the phase difference and the convergence time. Furthermore, it has become evident that the convergence time is dependent on a difference in rotation velocities before and after changing (a frequency difference in the clock signals) and the direction thereof (the sign of the frequency difference).

Therefore, the inventors of the present application found that the clock signals for driving the polygonal mirror should be changed with a phase difference (preferably a shortest phase difference) at which the convergence time is shortened. That is, if a change is made from the first-face clock signal (first frequency) to the second-face clock signal (second frequency) so as to achieve a specific phase difference, the difference in magnification ratios of the front and back sides can be reduced while improving the productivity during double sided printing.

According to FIG. 7, a desirable phase difference when changing speed from a frequency of 100% to 99.5% is 90°. This is because its convergence time is short compared to those at other phase differences. Of course, since there is a trade-off relationship between convergence times and productivity, as long as the phase difference enables a required productivity to be achieved, it may not necessarily have to be the phase difference that enables the shortest convergence time.

FIG. 8 is a diagram for describing change in the clock signals when the phase difference is set to 90° according to the present embodiment. When a command is received from the CPU 308 to commence a speed change, the selector 505 changes the clock signal that is to be outputted so that a phase difference of 90° is achieved between the clock signal to be applied to the second face and the clock signal that was applied to the first face.

According to the present embodiment, the storage unit 307 stores a plurality of phase differences corresponding to a plurality of pairs (groups) constituted by respectively different frequency differences and a sign thereof. For the paper type A shown in FIGS. 4A and 4B, the frequency difference is 0.20% and the sign is "− (minus)". Furthermore, for the paper type B, the frequency difference is 0.15% and the sign is "− (minus)". Accordingly, a phase difference (for example, 90°) is stored in the storage unit 307 corresponding to the pair constituted by the frequency difference 0.20% and the sign "− (minus)". Further still, a phase difference (for example, 135°) is stored in the storage unit 307 corresponding to the pair constituted by the frequency difference 0.25% and the sign "− (minus)". The CPU 308 reads out from the storage unit the phase difference corresponding to a pair of the frequency difference and the sign thereof.

FIG. 9 is an illustrative flowchart showing a control method according to the present embodiment. At step S901, the CPU 308 uses the paper type sensor 310 to distinguish the paper type. It should be noted that instead of the paper type or in addition to the paper type, the CPU 308 may obtain an environment parameter using the environment sensor 311.

At step S903, the CPU 308 adjusts the frequencies of the clock signals to be supplied when forming images on the first face and the second face in response to the paper type (and/or the environment parameter as required). The CPU 308 may obtain the corresponding period (frequency) from the aforementioned reference period table for example.

At step S905, the CPU 308 determines a phase difference between the clock signal corresponding to the first face and the clock signal corresponding to the second face in response to the frequency difference and the sign thereof between the clock signal corresponding to the first face and the clock signal corresponding to the second face.

At step S907, a command to change the clock signal so as to achieve the determined phase difference is supplied to the selector 505. The selector 505 changes from the clock signal from the first divider circuit to the clock signal from the second divider circuit with a timing by which the indicated phase difference is achieved. It should be noted that the CPU 308 may determine the timing by which the indicated phase difference is to be achieved and supplies the command to change to the selector 505 when that timing arrives.

According to the present embodiment, a change can be made from the clock signal for the first face to a clock signal for the second face with an appropriate phase difference in response to contraction of the printing material due to the fixing heat for fixing the image to the first face of the printing material. In this way, even though contraction of the printing material occurs, the front and back image sizes can be matched with higher accuracy than conventionally while as much as possible not allowing a drop in print productivity.

As described above, the contraction ratio of printing materials varies in response to the type of printing material. Accordingly, it is preferable to adjust the frequency of the clock signal for the second face in response to the type of printing material that has been distinguished. Similarly, the contraction ratios of printing materials vary in response to parameters of the environment in which the image forming apparatus is installed. Accordingly, it is preferable to adjust the frequency of the clock signal for the second face in response to the detected environment parameters.

It should be noted that if a plurality of phase differences are stored in advance corresponding to a plurality of pairs constituted by respectively different frequencies and signs thereof, then there is an advantage in that the computation load on the CPU 308 can be reduced and the computation times can be shortened.

It should be noted in regard to the phase differences that these may be determined in advance at the time of shipping from the factory and stored in the storage unit. Furthermore, it is also possible to write appropriate phase differences to the storage unit after shipping from the factory by having the CPU 308 measure convergence times of the rotation velocities of the drive unit while varying the phase difference in response to specific frequency differences and signs thereof. With the latter method, since the phase differences are determined also taking into account later-occurring factors that affect the image forming apparatus, it is possible that the accuracy of control can be improved more than the former method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-181444, filed Jul. 10, 2007, which is hereby incorporated by reference herein in its entirety.

What is claimed is:

1. An image forming apparatus configured to form an image on both sides of a printing material, comprising:
    a rotating polygonal mirror that rotationally deflects a light beam outputted from a light source so as to expose a photosensitive member;
    a drive unit that drives the rotating polygonal mirror in response to a supplied clock signal;
    a frequency adjusting unit that adjusts a frequency of a clock signal to be supplied to said drive unit when an image is to be formed on a second face in response to a contraction ratio of the printing material on which an image has been formed on a first face so as to reduce a difference between a magnification ratio of the image formed on the first face of the printing material and a magnification ratio of the image formed on the second face of the printing material;
    a phase difference determining unit that determines a phase difference between the clock signal corresponding to the first face and the clock signal corresponding to the second face in response to a frequency difference and a sign of the frequency difference between the clock signal corresponding to the first face and the clock signal corresponding to the second face;
    a change control unit that changes from the clock signal corresponding to the first face to the clock signal corresponding to the second face so as to achieve the determined phase difference;
    a storage unit in which is stored a plurality of phase differences corresponding to a plurality of pairs constituted by respectively different frequency differences and a sign thereof;
    a measurement unit that measures a convergence time of a rotation velocity of said drive unit while varying the phase difference for a specific frequency difference and the sign thereof; and
    a writing unit that writes to said storage unit a phase difference that was used when a smallest convergence time of a plurality of measured convergence times was measured as the phase difference corresponding to the specific frequency difference and the sign thereof,
    wherein said phase difference determining unit reads out from said storage unit the phase difference corresponding to a pair of the frequency difference and the sign thereof.

2. The image forming apparatus according to claim 1, wherein said frequency adjusting unit comprises:
    a type distinguishing unit that distinguishes a type of the printing material; and
    a frequency determining unit that determines, in response to the type of the printing material, a frequency of the clock signal to be supplied when an image is to be formed on the second face.

3. The image forming apparatus according to claim 1, wherein said frequency adjusting unit comprises:
    a detection unit that detects an environment parameter in an environment where the image forming apparatus is installed; and
    a frequency determining unit that determines, in response to the environment parameter, a frequency of the clock signal to be supplied when an image is to be formed on the second face.

4. The image forming apparatus according to claim 1, wherein contraction of the printing material occurs due to fixing heat for fixing an image to the first face of the printing material.

5. A control method of an image forming apparatus that is configured to form an image on both sides of a printing material and that includes a rotating polygonal mirror that rotationally deflects a light beam outputted from a light source so as to expose a photosensitive member, and a drive unit that drives the rotating polygonal mirror in response to a supplied clock signal, comprising:
- a step of adjusting a frequency of a clock signal to be supplied to the drive unit when an image is to be formed on a second face in response to a contraction ratio of the printing material on which an image has been formed on a first face so as to reduce a difference between a magnification ratio of the image formed on the first face of the printing material and a magnification ratio of the image formed on the second face of the printing material;
- a step of determining a frequency difference and a sign of the frequency difference between the clock signal corresponding to the first face and the clock signal corresponding to the second face;
- a step of determining a phase difference between the clock signal corresponding to the first face and the clock signal corresponding to the second face in response to the frequency difference and the sign thereof; and
- a step of changing from the clock signal corresponding to the first face to the clock signal corresponding to the second face so as to achieve the determined phase difference;
- a step of storing a plurality of phase differences corresponding to a plurality of pairs constituted by respectively different frequency differences and a sign thereof in a storage unit;
- a step of measuring a convergence time of a rotation velocity of said drive unit while varying the phase difference for a specific frequency difference and the sign thereof; and
- a step of writing to said storage unit a phase difference that was used when a smallest convergence time of a plurality of measured convergence times was measured as the phase difference corresponding to the specific frequency difference and the sign thereof,
wherein said step of determining comprises a step of reading out from said storage unit the phase difference corresponding to a pair of the frequency difference and the sign thereof.

* * * * *